United States Patent
Gallo et al.

(10) Patent No.: US 8,923,023 B2
(45) Date of Patent: Dec. 30, 2014

(54) CONVERTER CONTROL SYSTEM FOR A WIND TURBINE WITH A MODULAR CONVERTER

(75) Inventors: Rosa Laforga Gallo, Zamudio (ES); Ramon Santamaria Isla, Zamudio (ES); Marta Soto Asperribay, Zamudio (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 721 days.

(21) Appl. No.: 13/224,990

(22) Filed: Sep. 2, 2011

(65) Prior Publication Data

US 2012/0063182 A1 Mar. 15, 2012

(30) Foreign Application Priority Data

Sep. 9, 2010 (ES) .................................. 201001164

(51) Int. Cl.
*H02M 7/537* (2006.01)
*H02J 3/50* (2006.01)
*H02J 3/38* (2006.01)

(52) U.S. Cl.
CPC . *H02J 3/50* (2013.01); *H02J 3/386* (2013.01); *Y02E 10/763* (2013.01)
USPC ............................................ 363/65; 363/131

(58) Field of Classification Search
USPC ................ 363/34–37, 39–43, 50, 66, 73, 55, 363/56.01–56.09, 56.1, 56.11, 56.12, 363/97–98, 120–124, 131–134
See application file for complete search history.

(56) References Cited

U.S. PATENT DOCUMENTS

| | | | |
|---|---|---|---|
| 7,233,129 B2 * | 6/2007 | Erdman et al. .................. | 322/17 |
| 7,439,714 B2 * | 10/2008 | Llorente Gonzalez et al. . | 322/24 |
| 7,659,700 B2 * | 2/2010 | Holveck et al. ............... | 323/214 |
| 8,374,011 B2 * | 2/2013 | Wirth ............................. | 363/131 |
| 2003/0007369 A1 * | 1/2003 | Gilbreth et al. ................ | 363/35 |
| 2004/0165408 A1 * | 8/2004 | West et al. ..................... | 363/131 |
| 2008/0031024 A1 * | 2/2008 | Pasuri et al. .................... | 363/65 |
| 2010/0309692 A1 * | 12/2010 | Chisenga et al. .............. | 363/37 |
| 2011/0170323 A1 * | 7/2011 | Fulcher et al. ................. | 363/65 |
| 2012/0212064 A1 * | 8/2012 | Spanoche et al. ............. | 307/82 |

FOREIGN PATENT DOCUMENTS

EP 1 768 223 A2 3/2007

* cited by examiner

*Primary Examiner* — Adolf Berhane
*Assistant Examiner* — Nusrat Quddus
(74) *Attorney, Agent, or Firm* — Ladas & Parry LLP

(57) ABSTRACT

Converter control system coupled between a wind turbine generator and the electric power distribution grid, comprising at least two converter modules connected in parallel which are enabled/disabled by out-of-phase pulse-width modulation (PWM) patterns.
The control device guarantees dynamic switching of the converter modules irrespective of the enabling or disabling of at least one converter module, constantly delivering electric power to the distribution grid.

4 Claims, 5 Drawing Sheets

CONVERTER CONTROL SYSTEM FOR A WIND TURBINE WITH A MODULAR CONVERTER

OBJECT OF THE INVENTION

The object of the invention is related to the field of electric power generation by a wind turbine connected to a utility grid, and specifically to wind turbines and electric power conversion systems that include converter modules for delivering electric power to the utility grid.

BACKGROUND OF THE INVENTION

Wind turbines with variable rotor speed are connected to the utility grid through a power converter that converts the alternating current produced in a generator (which as a general rule is coupled to the blades through a gearbox) to direct current with adjustable frequency and amplitude.

For high-power applications, it is common to implement converters comprising various modules interconnected in parallel, which allow greater controllability of power delivery in the grid. To achieve the highest possible power, the components in these converter modules are oversized; because such maximum power can only be delivered to the grid on very isolated occasions, optimization of the various modules is needed in order to ensure proper management of each operating point in the converter.

Specifically, in the case of variable-speed wind turbines in which the power produced by the generator depends directly on the wind speed, delivering high-quality electric power to the distribution grid is a complex process. In addition, the connection of the grid inverter to the electricity distribution grid generates harmonics which need to be eliminated, since otherwise they could cause a fault in the wind turbine with the resulting stoppage of the machine.

Different strategies are known in the State of the Art for enabling and disabling the converter modules of a power converter, which seek to resolve the appearance of harmonics in order to improve the efficiency and reliability of those converters.

One example of switching strategy for modular converters connected in parallel can be seen in US patent 2008/0031024, which describes a modular converter comprising at least two modules coupled in parallel and controlled by a means of control. The invention improves the influence of harmonics on the grid, which are caused by the converter's connection to the network, by connecting as many converter modules as necessary at a given time, i.e., based on the wind and the power to be obtained, it enables or disables the converter modules in order to deliver the required power to the grid.

Another control strategy is the one described by this applicant in European Patent EP1768223, which proposes a method for using a wind turbine converter system, including converter modules connected in parallel and capable of converting the electric power produced by a generator to electric power applicable to a utility grid. The method determines the enabling/disabling of the converter modules in response to parameters related to the variable amount of electric power being produced by the generator, such as, for example, temperature of the converter module's components, reference apparent power and reference active power for the converter system, a current reference to the converter system, a measured value of the apparent power produced by the generator or the apparent power delivered to the grid, a measured value of the active power produced by the generator or the active power delivered to the grid, and a measured value of the current produced by the generator or the current delivered to the grid.

Moreover, the State of the Art also envisages the possibility of disconnecting modules for a short or extended period of time and proposes the enabling/disabling of the converter modules by means of pulse-width modulation (PWM) patterns, in such a way that two or more converters are out of phase in relation to each other, thus reducing the harmonic components arriving from PWM and, therefore, improving the quality of the voltage signal applied to the utility grid.

However, this solution has one disadvantage: whenever it is necessary to vary the number of converters connected and, therefore, the switching phase difference set by the PWM patterns, such switching needs to be stopped, the different modules have to be reconfigured with the new phase difference, and they must then be reconnected. In other words, delivery of electric power to the grid needs to be stopped, since enabling or disabling a new converter module causes current peaks that set off the overcurrent alarms, and the wind turbine would enter emergency stop mode. These stops cause substantial production losses.

DESCRIPTION OF THE INVENTION

This invention proposes a control system for a wind turbine converter which includes at least two converter modules connected in parallel and capable of converting the electric power produced by a generator to electric power applicable to a utility grid, and allows the number of enabled converters to be increased or decreased based on the wind speed.

Another object of the invention is to provide a control method which, through synchronized PWM connection of converter modules, guarantees the minimum level of harmonics in the distribution grid.

Another object of the invention is to guarantee dynamic switching between converter modules during delivery of electric power to the distribution grid, without the overcurrent protections going off and without voltage peaks being caused by connection or disconnection of different modules depending on the grid's needs.

To this end, the invention comprises a control system connected to the converter and to the wind turbine generator.

The control system calculates the number of converters that need to be connected to obtain a given power, based on the wind speed and a number of preset power parameters, in order to guarantee maximum converter efficiency and reliability.

Subsequently, and based on the number of enabled modules, it determines the number of converter modules that need to be enabled/disabled, while also calculating the new switching offset for the converter modules that need to be kept enabled.

The control system reconfigures the enabled control modules by changing their switching offsets (phase differences) in a gradual an continuous manner, guaranteeing that no current peaks appear in the distribution grid.

These and other aspects of the invention will be described in more detail with the help of the drawings and implementations shown below.

DESCRIPTION OF THE PREFERRED EMBODIMENT

Figure 1:
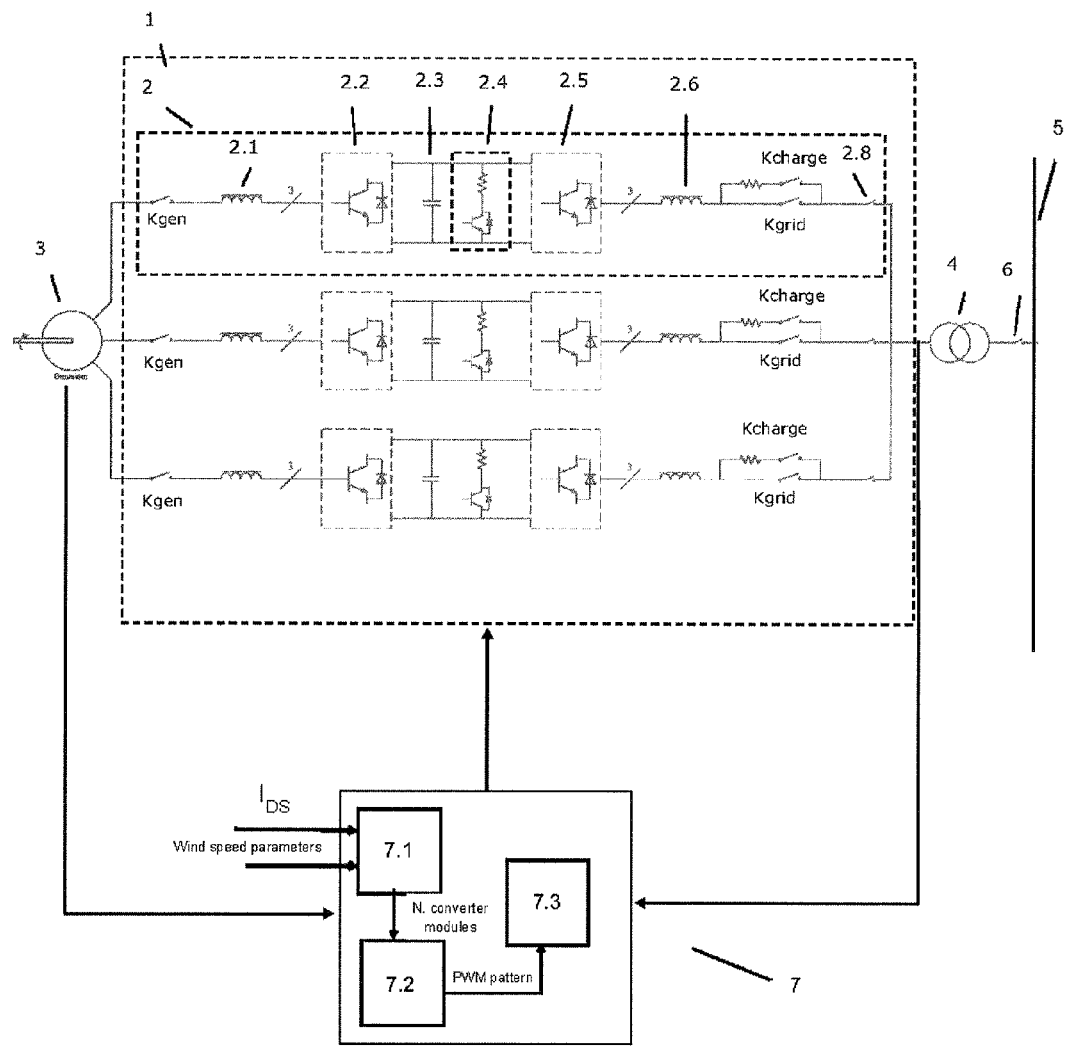
FIG. 1 shows an example of implementation of a control system according to the invention, connected to a wind turbine's converter.

FIG. 1 shows a converter (1) that comprises at least two conventional converter modules (2) connected in parallel and which is connected to a wind turbine generator (3), a transformer (4) that connects the signal of the converter system (1) to the utility grid (5) and a circuit breaker (6).

Each converter module (2) in the converter (1) includes a generator contactor (kgen) for disconnecting the generator (3) from the electronic mechanisms of the converter module (2), an inductor (2.1) to smooth out the generator's current, a generator inverter (2.2) to convert the AC signal of the generator (3) to a DC signal, a DC bus condenser (2.3) to filter the variations in the DC signal, a chopper brake (2.4) to dissipate the residual voltage, a grid-side inverter (2.5) to convert the DC signal to an AC signal, and an inductor (2.6) which, combined with condensers, reduces the harmonics in the voltage signal applied to the utility grid (5).

The converter module (2) also includes a grid contactor (kgrid) for disconnecting the utility grid (5) from the electronics of the converter module (2) and a circuit breaker (2.8) for disconnecting the utility grid (5) from the converter module (2) in the event of an overvoltage or overcurrent condition.

According to the invention, as shown in FIG. 1, the converter (1) is connected to a control system (7) which in turn is connected to the wind turbine's generator (3), and which guarantees efficient operation of the converter (1) and the quality of the voltage signal that is applied to the utility grid (5).

Before the converter modules (2) can supply electric power to the utility grid (5), they need to be enabled by transitioning from an initial disconnection state to a final, fully operational state which is controlled through said control system (7).

The generator-side inverter (2.2) and the grid-side inverter (2.5) of each converter module (2) are enabled by applying electric enabling signals, as voltage signals with pulse-width modulation (PWM), and are disabled by applying electric disabling signals, as zero-voltage signals, to the transistor gate of the generator-side inverter (2.2) and of the grid-side inverter (2.5); these are IGBT-type transistors.

The duration of the converter module (2) transition from the run-state to the off-state, or the duration of the opposite transition, from the off-state to the run-state, can be set between 1 and 10 seconds.

In order to improve the efficiency of the converter (1), the number of active converter modules (2) needs to be adapted to the actual amount of electric power produced by the generator (3). To do so, the control system (7) calculates a dynamic switching current $I_{DS}$ based on the difference between the current to be produced $I_{producible}$ and the converter's real current $I_{conv\_real}$ (which is the sum of all the real currents of the various converter modules). Interpolation between said dynamic switching current $I_{DS}$ and a table of parameters related to the wind speed will determine the number of converters that need to be enabled.

To prevent always enabling and/or disabling the same modules (2), the control system (7) has at least one enabling sequence that determines the order in which the converter modules (2) will be enabled and/or disabled. Moreover, if according to the preset enabling sequence it is necessary to enable the next converter module (2) and it is not ready, the control system (7) will enable the next converter module (2) according to that enabling sequence.

In addition, the control system (7) of the invention switches the grid-side inverter (2.3) based on pulse-width modulation (PWM), through which the harmonics generated by the PWM technique are reduced, thus guaranteeing that the pulse-width modulation (PWM) patterns of two or more converter modules (2) are out of phase in relation to each other. This phase difference will depend on the number of converter modules (2) that need to be connected to guarantee the efficiency of the converter (1) based on the amount of power produced by the generator (1).

The control system (7) dynamically regulates the switch from phase difference X, for a given number of enabled converter modules (2), to another phase difference Y, in relation to a higher or lower number of connected converter modules (2); to do so, before enabling or disabling the corresponding converter module, it gradually increases or decreases the phase difference existing between the connected converter modules, thus guaranteeing ongoing switching during this gradual phase difference variation and avoiding having to stop delivering power to the utility grid (5), as well as preventing the appearance of current peaks that can give rise to an alarm and cause the wind turbine to stop.

Figure 2A:
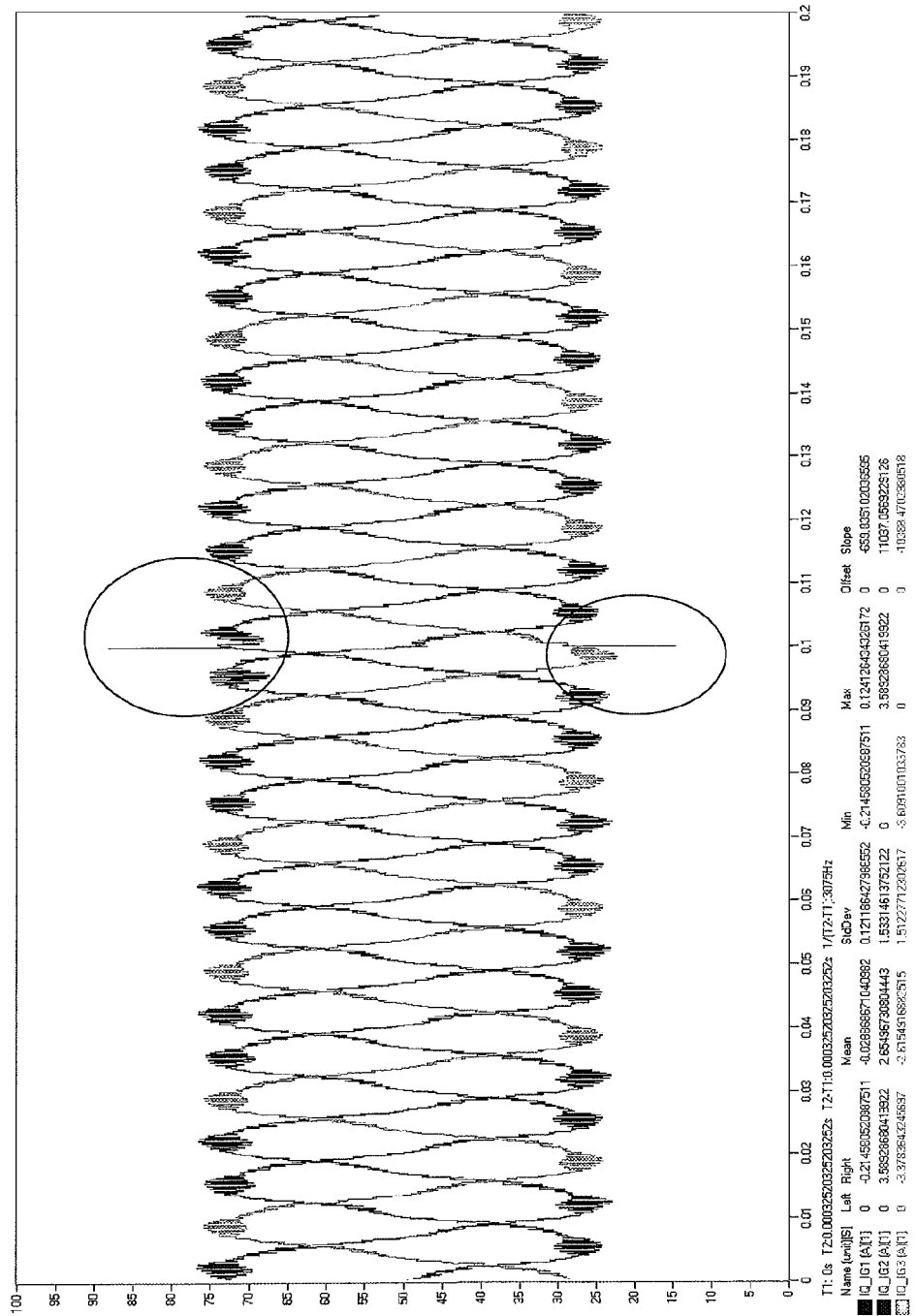
FIG. 2A shows a graph of the grid current signal without the control system of the invention.
Figure 2B:
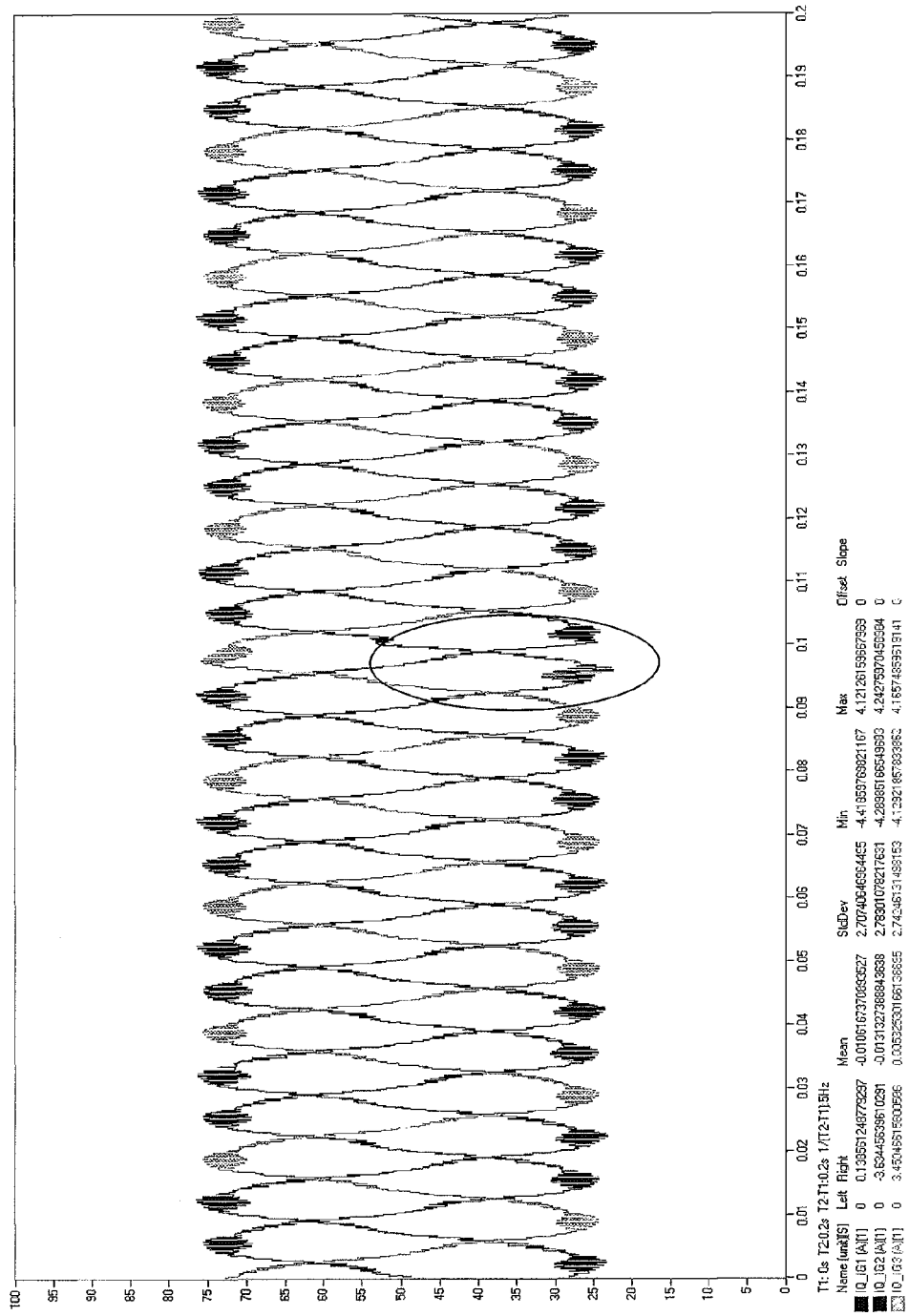
FIG. 2B shows a graph of the grid current signal with the control system of the invention.

FIGS. 2A and 2B show the grid current signal, with and without the control system respectively, for an offset variation (phase difference) of 90° to 180°, i.e., for a variation of 4 to 2 converter modules. As can be seen in the graph in FIG. 2A, in the grid current signal without the control system of the invention, when there is a variation in the number of connected converter modules, current peaks appear which cause overcurrents that generate alarms and cause electric power production to be stopped. FIG. 2B shows the current signal delivered to the grid by a converter equipped with the control system of the invention; no current peaks are seen in said current signal.

Figure 3A:
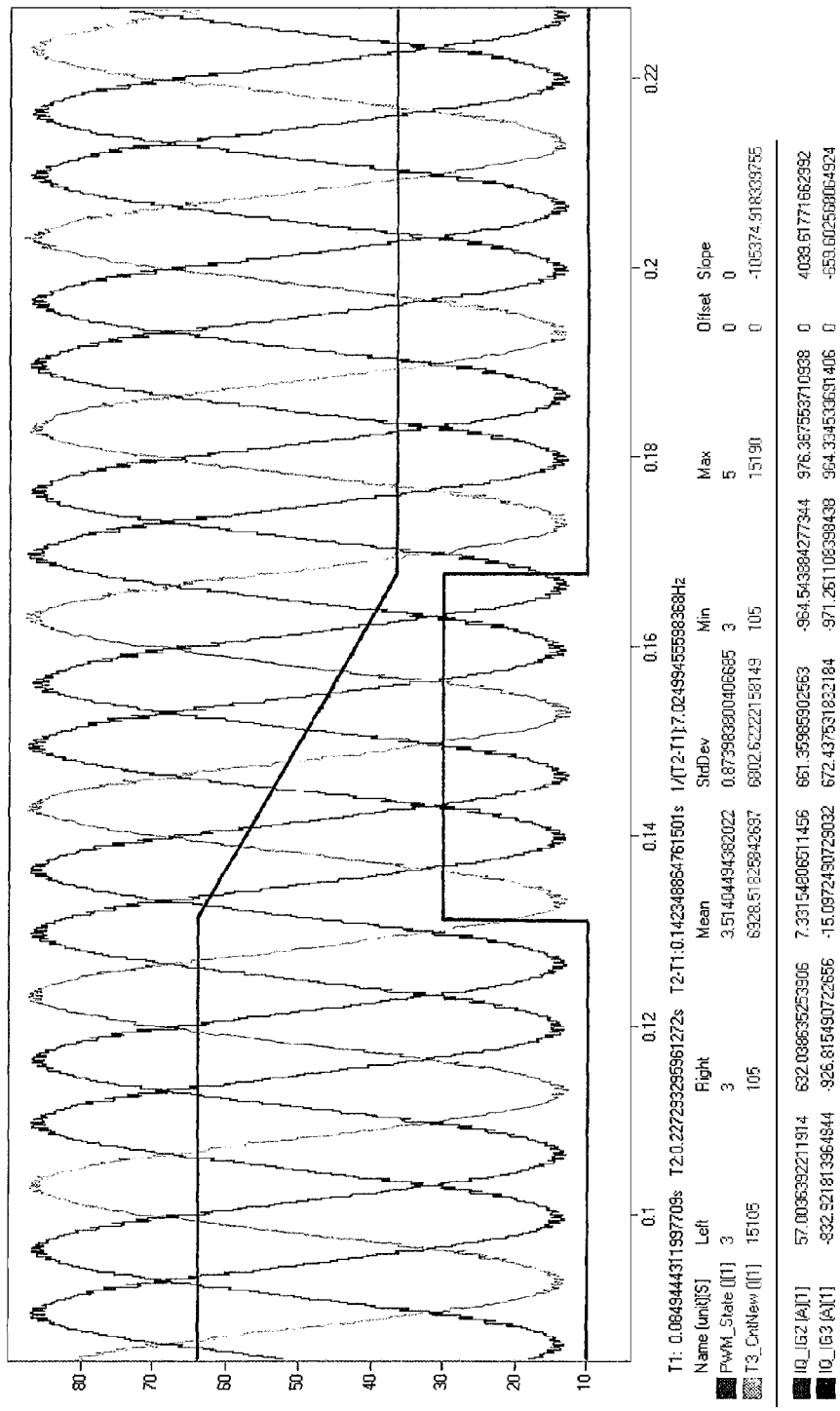
FIG. 3A shows a graph of the grid-side current signal for an offset change corresponding to a variation in the number of converter modules connected.
Figure 3B:
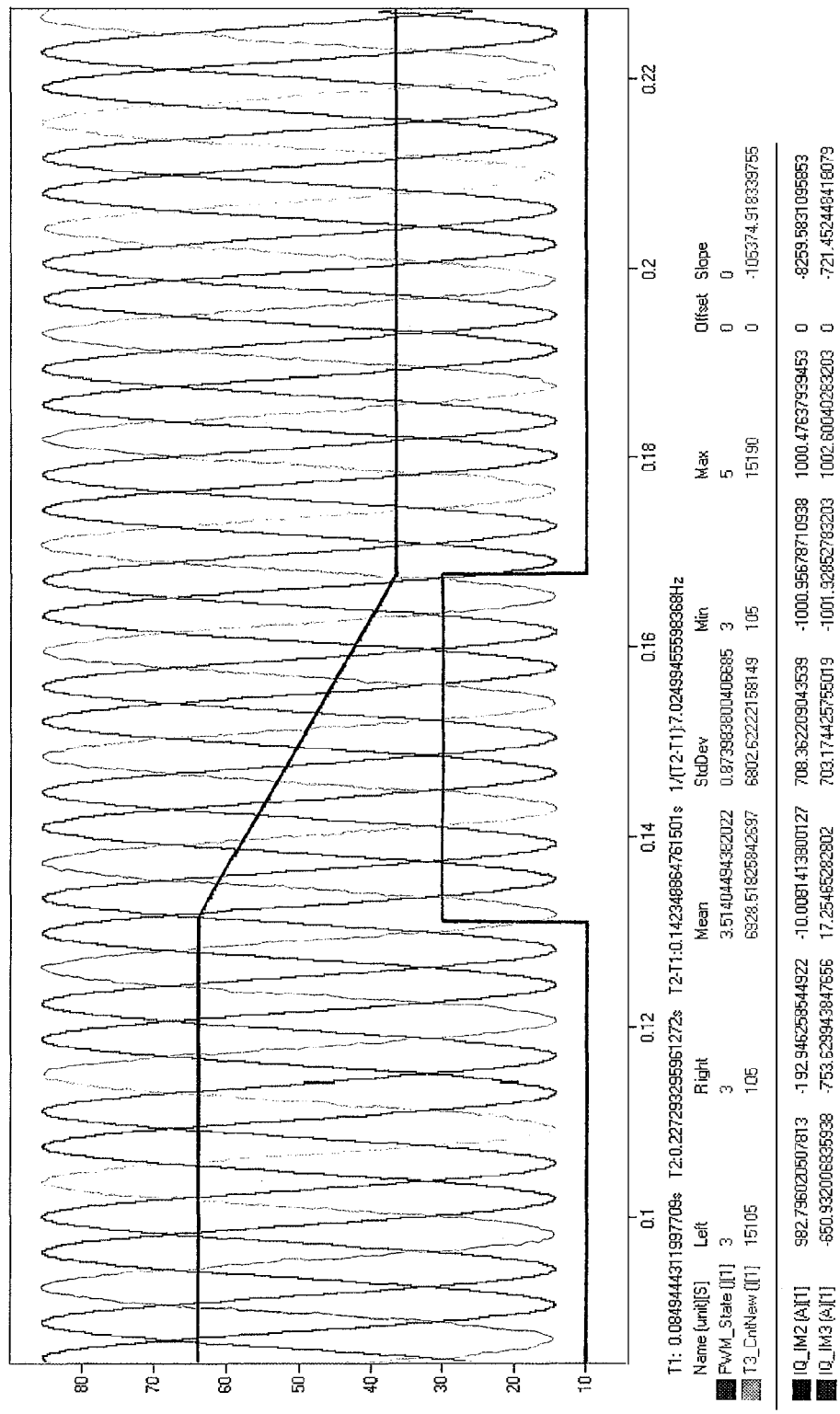
FIG. 3B shows a graph of the generator-side current signal in connection with the preceding figure.

As indicated above, the control system (7) checks the real amount of electric power produced by the generator (3) and, based on a number of preset power parameters related to the existing wind speed, determines (7.1) the number of converter modules (2) that need to be enabled, setting (7.2) in turn the pulse-width modulation (PWM) phase difference pattern between the converter modules (2) that need to be enabled and gradually varying (7.3), by means of a ramped signal, the phase differences between the enabled converter modules (2) until the phase difference of the modulation pattern determined in the calculations made is reached (see FIGS. 3A and 3B).

The invention claimed is:

1. A converter control system coupled between a wind turbine generator and a utility grid, which has at least two converter modules connected in parallel that are enabled/disabled by out-of-phase pulse-width modulation (PWM) patterns, wherein the control system dynamically enables or disables at least one converter module without disconnecting the converter from the utility grid, maintaining the quality of the electric power delivered to the utility grid constant and with no significant alterations, and varies the number of enabled converter modules by means of a PWM modulation pattern that modifies the switching phase differences of enabled modules in a gradual and continuous manner, until a new switching phase difference for the converter modules is reached, and ensures switching throughout the gradual variation of phase difference between modules.

2. The converter control system according to claim 1, wherein said converter control system determines the number of converter modules to be enabled/disabled based on the real amount of electric power produced by said wind turbine generator and a number of preset power parameters in relation to existing wind speed.

3. The converter control system according to claim 1, wherein said converter control system determines at least one enabling/disabling sequence for the converter modules that sets the order in which the converter modules will be enabled and/or disabled.

4. The converter control system according to claim 1, wherein said converter control system is connected between said wind turbine generator and said converter.

* * * * *